United States Patent
Kawamura et al.

(10) Patent No.: US 12,119,494 B2
(45) Date of Patent: Oct. 15, 2024

(54) POSITIVE ELECTRODE ACTIVE SUBSTANCE FOR LITHIUM ION SECONDARY BATTERY AND LITHIUM ION SECONDARY BATTERY

(71) Applicant: TORAY INDUSTRIES, INC., Tokyo (JP)

(72) Inventors: Hiroaki Kawamura, Otsu (JP); Tomoya Onozuka, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 17/792,880

(22) PCT Filed: Dec. 23, 2020

(86) PCT No.: PCT/JP2020/048111
§ 371 (c)(1),
(2) Date: Jul. 14, 2022

(87) PCT Pub. No.: WO2021/153110
PCT Pub. Date: Aug. 5, 2021

(65) Prior Publication Data
US 2023/0072041 A1  Mar. 9, 2023

(30) Foreign Application Priority Data

Jan. 30, 2020  (JP) ................. 2020-013245
Jan. 30, 2020  (JP) ................. 2020-013246

(51) Int. Cl.
*H01M 4/58* (2010.01)
*C01B 25/45* (2006.01)
*H01M 4/36* (2006.01)
*H01M 4/587* (2010.01)
*H01M 4/02* (2006.01)

(52) U.S. Cl.
CPC ........... *H01M 4/5825* (2013.01); *C01B 25/45* (2013.01); *H01M 4/366* (2013.01); *H01M 4/587* (2013.01); *C01P 2002/50* (2013.01); *C01P 2002/74* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/14* (2013.01); *C01P 2006/16* (2013.01); *C01P 2006/40* (2013.01); *H01M 2004/021* (2013.01); *H01M 2004/028* (2013.01)

(58) Field of Classification Search
CPC .......... H01M 2004/028; H01M 4/5825; C01P 2004/64
See application file for complete search history.

(56) References Cited

U.S. PATENT DOCUMENTS

| | | |
|---|---|---|
| 2004/0197659 A1 | 10/2004 | Kumar et al. |
| 2011/0037019 A1 | 2/2011 | Nakano et al. |
| 2011/0244329 A1 | 10/2011 | Chang et al. |
| 2014/0134490 A1* | 5/2014 | Balaya ............... H01M 4/5825 252/182.1 |
| 2015/0333319 A1* | 11/2015 | Kawamura ......... H01M 4/5825 252/506 |
| 2016/0190586 A1 | 6/2016 | Hoshina et al. |

FOREIGN PATENT DOCUMENTS

| | | | |
|---|---|---|---|
| CN | 107689448 A | 2/2018 | |
| JP | 2003-536231 A | 12/2003 | |
| JP | 2012-195134 A | 10/2012 | |
| JP | 2015-56223 A | 3/2015 | |
| JP | 2015056223 * | 3/2015 | ............... H01M 4/36 |
| WO | WO2009/131095 A1 | 10/2009 | |
| WO | WO 2013002730 * | 1/2013 | ............. C01B 25/45 |

OTHER PUBLICATIONS

International Search Report, issued in PCT/JP2020/048111, PCT/ISA/210, dated Mar. 16, 2021.
Written Opinion of the International Searching Authority, issued in PCT/JP2020/048111, PCT/ISA/237, dated Mar. 16, 2021.
Extended European Search Report for European Application No. 20916453.2, dated Apr. 30, 2024.
Taiwanese Search Report for Taiwanese Application No. 110100123, dated May 14, 2024.

* cited by examiner

*Primary Examiner* — Khanh T Nguyen
(74) *Attorney, Agent, or Firm* — Birch, Stewart, Kolasch & Birch, LLP

(57) ABSTRACT

The purpose of the present invention is to provide positive electrode active substance particles for a lithium ion secondary battery, such particles being capable of producing a lithium ion secondary battery having excellent high-speed discharge properties. The present invention is a granulated body of a positive electrode active substance for a lithium ion secondary battery, wherein the primary particle average diameter is 10 to 80 nm and the number of primary particles having a diameter of 100 nm or greater is no more than 5.0%.

12 Claims, No Drawings

POSITIVE ELECTRODE ACTIVE SUBSTANCE FOR LITHIUM ION SECONDARY BATTERY AND LITHIUM ION SECONDARY BATTERY

TECHNICAL FIELD

The present invention relates to a positive electrode active material for a lithium ion secondary battery and a lithium ion secondary battery using the same.

BACKGROUND ART

As the main application of a lithium ion secondary battery has become an electric vehicle, further improvement in characteristics is required for the lithium ion secondary battery. In particular, high-speed discharge characteristics play an important role in a part related to acceleration of a vehicle, and it is required to maintain a high energy density even during high-speed discharge.

On the other hand, in the lithium ion secondary batteries, there is a possibility that a malfunction of a lithium ion secondary battery may cause the stored energy to be released in a short time, resulting in firing and burning of the battery. Therefore, for lithium ion secondary batteries, improvement of both the energy density and the safety is an important problem.

It is well known that the safety of a lithium ion secondary battery largely depends on its positive electrode active material. In particular, a positive electrode active material called a layered oxide-based material, which is often used in smartphones, electric vehicles, and the like, has a high energy density, but has a safety problem such as a risk of releasing oxygen in a battery due to overcharge and leading to ignition.

Meanwhile, it is known that olivine-based positive electrode active materials ($LiMPO_4$) such as lithium iron phosphate ($LiFePO_4$), which are often used in stationary batteries and the like, are highly safe positive electrode materials that do not easily release oxygen because the oxygen is covalently bonded to phosphorus, and are thus relatively stable even at a high temperature.

Among the olivine-based positive electrode active materials, lithium manganese iron phosphate has lower ion conductivity and electron conductivity than lithium iron phosphate, and thus it is difficult to realize high-speed discharge when the lithium manganese iron phosphate is formed into a battery, and development for solving this problem has been advanced. For example, there have been proposed a positive electrode active material for a lithium secondary battery, having an olivine structure represented by chemical formula $A_xMB_yO_z$ (A is an alkali metal or an alkali earth metal, M contains at least two kinds of transition metal element, B is a representative element covalently bonded to oxygen O to form an anion, $0 \leq x \leq 2$, $1 \leq y \leq 2$, and $3 \leq x \leq 7$), and having a surface coated partially or entirely with a carbon material (see, for example, Patent Document 1), a positive electrode active material for a lithium secondary battery, including a polyanion-based compound particle coated with carbon (see, for example, Patent Document 2), and the like.

PRIOR ART DOCUMENTS

Patent Documents

Patent Document 1: Japanese Patent Laid-open Publication No. 2014-32803
Patent Document 2: WO 2014/017617 A

SUMMARY OF THE INVENTION

Problems to be Solved by the Invention

In general, high-speed discharge characteristics of a positive electrode material of a lithium ion battery are limited by electron conductivity and ion conductivity, and improvement thereof is required at all times. In particular, lithium manganese iron phosphate is known to have particularly low electron conductivity and ion conductivity, and thus it is difficult to improve the energy density (Wh/kg) during high-speed discharge. In order to compensate for low electron conductivity and ion conductivity, it is effective to form primary particles of lithium manganese iron phosphate into nanoparticles having a particle diameter of 100 nm or less, and to decrease the in-solid diffusion distance of electrons and lithium ions in the primary particles during the charge-discharge reaction. It is also effective to mix lithium manganese iron phosphate and a carbon source such as glucose, and fire the mixture at a high temperature of 600° C. or higher to form a carbon cover layer on the surface of lithium manganese iron phosphate particles, thereby enhancing the electron conductivity.

However, nanoparticulation reduces the in-solid diffusion distance while improving the surface energy of the particle surface. Therefore, sintering of the particles easily proceeds during firing for forming the carbon cover layer. The coarsened particles obtained by sintering in this way may occur over the whole lithium manganese iron phosphate particles depending on firing temperature conditions, but partially appear under optimized firing temperature conditions.

Coarsened particles connected by sintering cause deterioration of high-speed discharge characteristics. On the other hand, the crystallite size determined from powder X-ray diffraction, which is a conventional evaluation method, and the average particle diameter of a large number of particles using an electron microscope are characteristics for sintering that occurs macroscopically, and a policy of suppressing sintering of primary particles of micro lithium manganese iron phosphate has not been obtained.

Therefore, the material mainly containing lithium manganese iron phosphate obtained by the methods disclosed in Patent Documents 1 and 2 has a problem in that coarse particles are likely to be generated by sintering of particles during firing, and high-speed discharge characteristics are insufficient.

In view of such problems, an object of the present invention is to provide a positive electrode active material for a lithium ion secondary battery, the positive electrode active material being capable of producing a lithium ion secondary battery having excellent high-speed discharge characteristics.

Solutions to the Problems

The present invention mainly has the following constitutions, in order to solve the above-mentioned problems. A positive electrode active material for a lithium ion secondary battery, the positive electrode active material being a granulated body of positive electrode active material particles for a lithium ion secondary battery, wherein an average particle diameter of primary particles is 10 nm or more and 80 nm or less, and a number ratio of primary particles having a particle diameter of 100 nm or more is 5.0% or less.

Effects of the Invention

By using the positive electrode active material for a lithium ion secondary battery of the present invention, a lithium ion secondary battery having excellent high-speed discharge characteristics can be obtained.

EMBODIMENTS OF THE INVENTION

A positive electrode active material for a lithium ion secondary battery (hereinafter, simply referred to as a "positive electrode active material" in some cases) of the present invention is a material capable of reversibly reacting with lithium ions, and for example, $LiMn_2O_4$ called a spinel-based positive electrode active material, $LiMO_2$ (M is one or more selected from Mn, Co, Ni, and Al) called a layered oxide-based positive electrode active material, $LiMPO_4$ (M is one or more selected from Fe, Mn, Co, and Ni) called an olivine-based positive electrode active material, and the like can be used.

The average particle diameter of primary particles of the positive electrode active material of the present invention is 10 nm or more and 80 nm or less, and the number ratio of particles having a particle diameter of 100 nm or more is 5.0% or less. The high-speed discharge characteristics vary depending on the particle diameter of primary particles of the positive electrode active material, but according to the study of the present inventors, it has been found that high high-speed discharge characteristics can be obtained by setting the average particle diameter of primary particles to 10 nm or more and 80 nm or less and the number ratio of primary particles having a particle diameter of 100 nm or more to 5.0% or less.

The term "granulated body" in the present specification refers to one which becomes particulate by a plurality of primary particles aggregating. However, even when a plurality of primary particles aggregate, if the shape as a whole is amorphous, the resulting matter is an aggregate and is not included in the granulated body.

The average particle diameter of primary particles of the positive electrode active material of the present invention is 10 nm or more and 80 nm or less. In general, the positive electrode active material has low electron conductivity and ion conductivity, and in order to improve high-speed discharge characteristics, it is necessary to decrease the average particle diameter of primary particles and to shorten the in-solid diffusion distance of electrons and lithium ions in the particles. When the average particle diameter of primary particles of the positive electrode active material is larger than 80 nm, the in-solid diffusion distance becomes long, and thus high-speed discharge characteristics are deteriorated. On the other hand, when the average particle diameter of primary particles of the positive electrode active material is smaller than 10 nm, the crystallinity on the surface of the primary particles is decreased to increase a portion that cannot contribute to the charge-discharge reaction, and thus the energy density is decreased.

Here, the average particle diameter of primary particles of the positive electrode active material can be measured using a scanning electron microscope. Specifically, the average particle diameter can be determined by magnifying and observing the positive electrode active material at a magnification of 200,000 times using a scanning electron microscope, measuring the particle diameters of 200 primary particles randomly selected, and calculating a number average value. When the primary particle is not spherical, the particle diameter of a non-spherical particle is the average value of the major axis and the minor axis that can be measured in a two-dimensional image. When two or more particles are connected by sintering, these particles are regarded as one particle. When it is difficult to determine whether it is sintering or contact, an image is binarized into white and black, and when a line dividing a connection portion is obtained, it is determined as contact so that the particles are regarded as two particles, and when the line is not obtained, it is determined as sintering so that the particles are regarded as one particle.

The present inventors have paid attention to sintering of primary particles of a microscopic positive electrode active material and have found that high-speed charge characteristics vary depending on the number ratio of particles having a particle diameter of 100 nm or more as an index thereof. In the positive electrode active material in the present invention, the number ratio of particles having a particle diameter of 100 nm or more among the positive electrode active material particles forming the granulated body is 5.0% or less. Since the particles having a particle diameter of 100 nm or more are coarsened particles due to the progress of sintering and cause deterioration of high-speed discharge characteristics, when the number ratio of particles having a particle diameter of 100 nm or more exceeds 5.0%, high-speed charge characteristics are deteriorated. The number ratio of particles having a particle diameter of 100 nm or more is preferably 3.0% or less. Even when the crystallite size and the average particle diameter evaluated in a state in which a small amount of the positive electrode active material having a particle diameter of 100 nm or more is mixed with the positive electrode active material having a particle diameter of 80 nm or less, it is difficult to obtain a result suggesting the presence of particles having a particle diameter of 100 nm or more. Therefore, in the present invention, the positive electrode active material is magnified and observed at a magnification of 200,000 times using a scanning electron microscope, the particle diameters of 200 primary particles randomly selected are measured, and the number ratio (%) of particles having a particle diameter of 100 nm or more is calculated. When the particle is not spherical, the particle diameter of a non-spherical particle is the average value of the major axis and the minor axis that can be measured in a two-dimensional image. When two or more particles are connected by sintering, these particles are regarded as one particle. When it is difficult to determine whether it is sintering or contact, an image is binarized into white and black, and when a line dividing a connection portion is obtained, it is determined as contact so that the particles are regarded as two particles, and when the line is not obtained, it is determined as sintering so that the particles are regarded as one particle.

The positive electrode active material of the present invention is preferably the olivine-based positive electrode active material described above. The olivine-based positive electrode active material has high safety among the positive electrode active materials. Meanwhile, the olivine-based positive electrode active material has particularly low electron conductivity and ion conductivity, and thus has low high-speed discharge characteristics. By the effect of the present invention, electron conductivity and ion conductivity are improved, and a safe battery having high-speed discharge characteristics can be obtained.

The primary particles of the olivine-based positive electrode active material in the present invention preferably has a carbon cover layer on surfaces. That is, it is preferable that carbon exists as a coating film on the surfaces of the primary particles.

The ratio of carbon contained in the granulated body of the olivine-based positive electrode active material in the present invention is preferably 2.0 wt % or more and 5.0 wt % or less. When carbon is contained in an amount of 2.0 wt % or more, high conductivity is exhibited in the battery, so that high-speed discharge characteristics can be further improved. On the other hand, when carbon is contained in an amount of 5.0 wt % or less, movement of lithium ions to be removed and inserted from and into the primary particles of the positive electrode active material is hardly inhibited, so that high-speed discharge characteristics can be further improved. As carbon contained in the granulated body of the olivine-based positive electrode active material, carbon derived from the carbon cover layer is preferred.

Here, the weight ratio of carbon contained in the granulated body of the olivine-based positive electrode active material can be measured using a carbon/sulfur analyzer EMIA-810W (manufactured by HORIBA, Ltd.).

The positive electrode active material of the present invention is preferably lithium manganese iron phosphate (hereinafter, referred to as "LMFP" in some cases) represented by $Li_\alpha Mn_a Fe_b PO_4$ ($0.9 \leq \alpha \leq 1.1$, $0.6 \leq a \leq 1.0$, $0 < b \leq 0.4$, and $0.9 \leq a+b \leq 1.1$) among the olivine-based positive electrode active materials, from the viewpoint that a battery having a higher energy density can be obtained. When α is less than 0.9 or more than 1.1, the energy density is decreased due to the presence of impurities other than LMFP or an increase in the number of defects in the crystal. When a+b is less than 0.9 or more than 1.1, the energy density is decreased due to the presence of impurities other than LMFP or an increase in the number of defects in the crystal.

Here, the composition of LMFP can be estimated from the ratio of raw materials charged at the time of synthesizing the LMFP particles, but the obtained LMFP can be used to specify lithium by atomic absorption spectrometry and manganese, iron, and phosphorus by ICP emission spectrometry. α, a, b in the above formula are measured to the third decimal place and rounded off to the second decimal place.

In the LMFP in the present invention, a ratio $I_{20}/I_{29}$ of a peak intensity at 20° to a peak intensity at 29° obtained by X-ray diffraction is preferably 0.88 or more and 1.05 or less. A ratio $I_{35}/I_{29}$ of a peak intensity at 35° to the peak intensity at 29° obtained by X-ray diffraction is preferably 1.05 or more and 1.20 or less.

A 20° peak, a 29° peak, and a 35° peak obtained by powder X-ray diffraction are indexed by (101), (020), and (311) planes respectively, the intensity of each peak refers to the intensity of the orientation to each crystal plane. In particular, the (020) plane is the most easily grown plane in the LMFP, and the orientation tends to be strong. Therefore, the fact that the ratios of $I_{20}/I_{29}$ and $I_{35}/I_{29}$ are within the above ranged means that the primary particles in the positive electrode active material are not particles oriented in (020) but are uniformly crystal-grown, and the shape of the particle is close to a spherical shape. In the LMFP in which the lattice volume change of the crystal is as large as about 10% during charge and discharge, having a homogeneous shape has an effect of alleviating distortion of the crystal in the particle generated during charge and discharge, and high-speed discharge characteristics can be further improved.

Here, the X-ray diffraction peak of LMFP can be measured using an X-ray diffractometer in which Cu is used as an X-ray source.

The average diameter of pores included in the granulated body of the positive electrode active material in the present invention is preferably 10 nm or more and 60 nm or less. Since the positive electrode active material expands and contracts during the charge-discharge reaction, the structure of the granulated body collapses and the cycle resistance decreases when the positive electrode active material is repeatedly charged and discharged. When the average diameter of pores is 60 nm or less, an excessive increase in void ratio in the granulated body is prevented, the granulated body is suppressed from becoming brittle, and the cycle resistance can be improved, which is preferable. On the other hand, when the average diameter of pores is 10 nm or more, delay of the charge-discharge reaction caused by insufficiency of the liquid amount of the electrolytic solution for exchanging lithium ions with the positive electrode active material is suppressed, and a decrease in cycle resistance caused by overvoltage inside the granulated body can be suppressed, which is preferable.

Here, the average diameter of pores refers to a median diameter, and can be measured by a mercury injection method using a pore distribution measuring device AutoPore IV9520 Type (manufactured by SHIMADZU CORPORATION). The measurement is performed under the condition of an initial pressure of 7 kPa, and the mercury parameter is set to a mercury contact angle of 130.0° and a mercury surface tension of 485.0 Dynes/cm. However, for distinguishing voids between granulated bodies from pores, the average diameter of pores is performed in a range of a pore diameter of 1 nm or more and 200 nm or less.

In the granulated body of the positive electrode active material in the present invention, the sum of pore volumes of pores having a pore diameter of 1 nm or more and 60 nm or less is preferably 0.100 $cm^3/g$ or more and 0.300 $cm^3/g$ or less. In order for the positive electrode active material to contribute to the charge-discharge reaction, not only the positive electrode active material is simply in contact with the electrolytic solution but also the amount of the electrolytic solution capable of exchanging lithium ions necessary for the charge-discharge reaction is required. By appropriately having micropores having a pore diameter of 1 nm or more and 60 nm or less in the granulated body, the positive electrode active material can be brought into contact with the electrolytic solution in an amount necessary for charge and discharge, and the charge-discharge reaction rapidly proceeds. When the sum of pore volumes of such pores is 0.100 $cm^3/g$ or more, it is prevented that particles that cannot be in contact with a required amount of the electrolytic solution are generated and the charge-discharge reaction is delayed. As a result, the occurrence of overvoltage inside the granulated body can be suppressed to improve the cycle resistance, which is preferable. On the other hand, when the sum of pore volumes is 0.300 $cm^3/g$ or less, the ratio of voids in the granulated body is prevented from being excessively high, and the granulated body does not become brittle, so that the structure of the granulated body is less likely to collapse when repeatedly charged and discharged, and the cycle resistance is improved, which is preferable.

Here, the sum of pore volumes of pores having a pore diameter of 1 nm or more and 60 nm or less can be measured by a mercury injection method using a pore distribution measuring device AutoPore IV9520 Type (manufactured by SHIMADZU CORPORATION). The measurement conditions are the same as the measurement conditions of the pore diameter described above.

In the granulated body of the positive electrode active material in the present invention, the maximum value of the log differential pore volume of pores having a pore diameter of 1 nm or more and 60 nm or less is preferably 0.30 cm$^3$/g or more. The log differential pore volume is an index indicating a rate of change in pore volume with respect to a logarithmic pore diameter, and means that, as the maximum value thereof is larger, the distribution of pore diameters is narrower and uniform pores are formed. In order for the particles of the positive electrode active material to contribute to the charge-discharge reaction, it is necessary that the particles are in contact with the electrolytic solution in an amount necessary for the charge-discharge reaction, and for this purpose, it is preferable to have micropores having a pore diameter of 1 nm or more and 60 nm or less in a uniform size in the granulated body. When the log differential pore volume of such micropores is 0.30 cm$^3$/g or less, the distribution of the size of the pore diameter is narrow, and pores having a partially small amount of the electrolytic solution are hardly generated. Therefore, the charge-discharge reaction is likely to uniformly proceed as a whole, and overvoltage is less likely to occur inside the granulated body, so that the cycle resistance is improved.

Here, the maximum value of the log differential pore volume of pores having a pore diameter of 1 nm or more and 60 nm or less can be measured by a mercury injection method using a pore distribution measuring device AutoPore IV9520 Type (manufactured by SHIMADZU CORPORATION). The measurement conditions are the same as the measurement conditions of the pore diameter described above.

In the granulated body of the positive electrode active material in the present invention, the pore specific surface area of pores having a pore diameter of 1 nm or more and 60 nm or less is preferably 25 m$^2$/g or more and 50 m$^2$/g or less. The pore specific surface area correlates with the contact area between the electrolytic solution and the positive electrode active material particles. When the pore specific surface area of micropores having a pore diameter of 1 nm or more and 60 nm or less is 25 m$^2$/g or more, the contact area between the positive electrode active material particles and the electrolytic solution increases, and the charge-discharge reaction rapidly proceeds while further suppressing the generation of overvoltage in the granulated body of the positive electrode active material, so that the cycle resistance can be further improved. The pore specific surface area is more preferably 30 m$^2$/g or more. On the other hand, when the pore specific surface area is 50 m$^2$/g or less, formation of excessive voids in the granulated body of the positive electrode active material can be suppressed, and the cycle resistance can be further improved. The pore specific surface area is more preferably 40 m$^2$/g or less.

Here, the pore specific surface area of micropores having a pore diameter of 1 nm or more and 60 nm or less can be measured by a mercury injection method using a pore distribution measuring device AutoPore IV9520 Type (manufactured by SHIMADZU CORPORATION). The measurement conditions are the same as the measurement conditions of the pore diameter described above.

Examples of means for setting the average diameter of pores of the granulated body of the positive electrode active material in the present invention, and the sum of pore volumes, the maximum value of a log differential pore volume, and the pore specific surface area of pores having a pore diameter of 1 nm or more and 60 nm or less in the above ranges include a method for producing a granulated body of a positive electrode active material by a preferred method described later.

The specific surface area of the positive electrode active material in the present invention is preferably 30 m$^2$/g or more and 45 m$^2$/g or less. By setting the specific surface area to 30 m$^2$/g or more, the contact area with the electrolytic solution in the battery is increased, so that high-speed discharge characteristics can be further improved. On the other hand, by setting the specific surface area to 45 m$^2$/g or less, the particle surface of the positive electrode active material is stabilized, so that generation of gas due to side reaction with the electrolytic solution can be suppressed.

Here, the specific surface area of the positive electrode active material can be measured by a BET flow method (adsorption gas $N_2$) using a fully automatic specific surface area measuring apparatus Macsorb HM Model-1210 (manufactured by Mountech Co., Ltd.).

The volume resistivity of the positive electrode active material in the present invention is preferably $10^5$ Ω·cm or less. When the volume resistivity is $10^5$ Ω·cm or less, high conductivity can be exhibited when a battery is formed, and high-speed discharge characteristics can be further improved.

Here, the volume resistivity of the positive electrode active material is measured with the positive electrode active material in a green compact state. Specifically, the volume resistivity can be measured under the condition of 25 MPa using a powder resistance measuring system MCP-PD51 (manufactured by Mitsubishi Chemical Analytech Co., Ltd.).

The average particle diameter of the granulated body of the positive electrode active material in the present invention is preferably 1.0 μm or more and 20.0 μm or less. The positive electrode active material of a lithium ion battery is generally formed into a paste using N-methylpyrrolidinone as a dispersion medium, applied to an aluminum foil, and dried and pressed to form a mixture layer. The thickness of the mixture layer is generally 10 μm or more and 200 μm or less, and it is preferable that the mixture layer is granulated so as to be within this thickness, and thus the average particle diameter is preferably 20.0 μm or less. On the other hand, when the average particle diameter is 1.0 μm or more, the viscosity of the paste described above can be moderately suppressed, and coatability can be improved.

Here, the average particle diameter of the granulated body can be measured using a scanning electron microscope. Specifically, the average particle diameter can be determined by magnifying and observing the granulated body at a magnification of 3,000 times using a scanning electron microscope, measuring the particle diameters of 100 granulated bodies randomly selected, and calculating a number average. When the secondary particle is not spherical, the particle diameter of a non-spherical particle is the average value of the major axis and the minor axis that can be measured in a two-dimensional image.

Next, a method for producing the positive electrode active material of the present invention will be described.

The positive electrode active material of the present invention can be obtained, for example, by producing primary particles of LMFP, then making the primary particles into a dispersion in a monodispersed state, subsequently granulating the LMFP primary particles from the dispersion, and forming a carbon cover layer by firing.

Examples of the method for producing LMFP primary particles include a solid phase method and a liquid phase method. From the viewpoints that the average particle diameter of primary particles is 10 nm or more and 80 nm or less and LMFP primary particles having a narrow particle size distribution are more easily obtained, the liquid phase method is suitable. By producing nanoparticles by a liquid phase method, the specific surface area of the LMFP granulated body can be easily adjusted to 30 $m^2/g$ or more and 45 $m^2/g$ or less. As the liquid phase, water or water to which an organic solvent is added in order to refine the primary particles to nanoparticles is preferred. Examples of the organic solvent include alcohol-based solvents such as ethylene glycol, diethylene glycol, triethylene glycol, tetraethylene glycol, 2-propanol, 1,3-propanediol, and 1,4-butanediol, and dimethyl sulfoxide. Two or more kinds of these may be used. In the synthesis process, pressurizing may be performed for improvement of the crystallinity of the particle. The ratio of manganese and iron contained in the LMFP primary particles can be adjusted in a desired range by the charging ratio of raw materials.

In the liquid phase method, LMFP primary particles can be obtained by adding a raw material of LMFP to the above-described liquid phase and heating the mixture. When the raw material of LMFP is dissolved in an organic solvent, uniformity of particles to be obtained is improved, and thus it is preferable to use a raw material having high solubility in the organic solvent. From the viewpoint of having high solubility in a mixed solvent of water and an organic solvent, it is preferable to use lithium hydroxide as a lithium raw material, manganese sulfate as a manganese raw material, iron sulfate as an iron raw material, and orthophosphoric acid as a phosphoric acid raw material, and these raw materials may be hydrates.

When the LMFP primary particles are obtained by the liquid phase method, the average particle diameter of the primary particles can be adjusted in a desired range, for example, according to conditions such as a mixing ratio of water and an organic solvent in the liquid phase, a concentration of a synthesis solution, and a synthesis temperature. In order to reduce the average particle diameter, it is effective to reduce the proportion of water in the liquid phase, to reduce the concentration of the synthesis solution, to reduce the synthesis temperature, and the like. It is preferable to add the solution of the manganese raw material, the iron raw material, and the phosphoric acid raw material to the lithium raw material solution in a state where the lithium raw material solution is stirred at a high speed, and heat the resultant solution to the synthesis temperature without pressurization while maintaining a state where the lithium raw material solution is stirred at a high speed, and the ratios $I_{20}/I_{29}$ and $I_{35}/I_{29}$ of the peak intensity obtained by X-ray diffraction of the positive electrode active material including the LMFP granulated body can be easily adjusted in the above-described preferable range.

Examples of the method for granulating the LMFP primary particles include a fluidized bed granulation method and an extrusion granulation method. In order to narrow the particle size distribution of the granulated body as much as possible, it is preferable to use a spray dryer.

As a method for forming a carbon cover layer on the LMFP primary particles of the LMFP granulated body, for example, it is preferable to prepare an LMFP primary particle dispersion, then add and dissolve a saccharide, dry and granulate the dispersion using a spray dryer, and heat the resultant product to 600° C. to 800° C. in a nitrogen atmosphere to fire the resultant product. A carbon cover layer can be formed on the primary particle surface by firing the LMFP primary particles with a saccharide. Examples of the saccharide include glucose, sucrose, maltose, lactose, fructose, galactose, mannose, dextrin, and cyclodextrin. Among these, when water is used as a dispersion medium during spray drying, glucose and sucrose are preferable in consideration of high solubility in water. The ratio of carbon contained in the LMFP primary particles can be adjusted in a desired range by the addition amount of the saccharide. By increasing the temperature during firing, the volume resistivity of the LMFP primary particles and the LMFP granulated body can be reduced.

In the present invention, in order to set the number ratio of primary particles having a particle diameter of 100 nm or more to 5.0% or less, it is preferable to set the dispersion state of the LMFP primary particles in the dispersion to be subjected to spray drying to a monodispersed state. One of reasons why particles having a particle diameter of 100 nm or more are generated is particle growth during firing. In order to suppress the particle growth, it is effective to lower the firing temperature; on the other hand, carbonization of saccharide is insufficient, and the conductivity tends to decrease. That is, there was a trade-off relationship between suppression of particle growth and expression of high conductivity. However, according to the study of the present inventors, it has been found that, by setting the LMFP particles in the dispersion to be subjected to spray drying in a monodispersed state, the contact area between particles inside the granulated body is reduced, so that the particle growth can be suppressed even when the firing temperature is high.

In order to set the dispersion state of the LMFP primary particles to a monodispersed state, it is preferable that the LMFP primary particles are subjected to liquid phase synthesis, then washed with pure water without being dried, and subjected to a crushing step. By not performing the drying step, dry aggregation can be suppressed. The washing with pure water also serves to adjust the pH of the dispersion, and in the case of liquid phase synthesis, since a trace amount of residual ions generated by the synthesis are present, the pH can be adjusted by repeating the washing until the pH reaches a desired pH. As compared with the method of adjusting the pH by adding an additive such as sodium hydroxide, it is not necessary to add unnecessary ions to LMFP, so that a decrease in energy density in the battery can be suppressed. In order to improve the dispersion state of the primary particles of LMFP, the pH of the dispersion is preferably 9 or more and 11 or less. Examples of a crushing device used in the crushing step include a shear mixer, a planetary ball mill, a bead mill, an ultrasonic homogenizer, and a dry jet mill. A shear mixer, a wet jet mill, a bead mill, and an ultrasonic homogenizer are preferable in that the LMFP primary particles can be treated as a dispersion without being dried, and a shear mixer and a wet jet mill is further preferable in that dispersion can be uniformly crushed.

Here, the dispersion state of the dispersion can be evaluated by a dynamic light scattering particle size distribution measuring apparatus. When the obtained average particle diameter is within twice the average particle size of the primary particles measured with a scanning electron microscope, it is determined that the dispersion state is a monodispersed state.

In order to set the specific surface area of the LMFP granulated body in the present invention to 30 $m^2/g$ or more and 45 m²/g or less, the average particle diameter of the LMFP primary particles is set to preferably 30 nm or more and 60 nm or less.

In order to set the average particle diameter of the LMFP granulated body in the present invention to 1.0 μm or more and 20.0 μm or less, for example, in the above-described production method, the concentration of the dispersion to be subjected to spray drying is set to preferably 20 w % or more and 60 wt % or less.

A positive electrode for a lithium ion secondary battery can be obtained, for example, by applying a paste in which the above-described granulated body is dispersed in a dispersion medium onto a current collector, drying the paste, and pressurizing the paste to form a mixture layer. As a method for producing a paste, it is preferable to mix and solid-knead the above-described granulated body and, as necessary, an additive such as a conductive auxiliary agent, a binder, and N-methylpyrrolidinone, and to adjust the viscosity by adding a dispersion medium such as water or N-methylpyrrolidinone. The solid content concentration of the paste can be appropriately selected according to the coating method. From the viewpoint of making the coating film thickness uniform, the solid content concentration thereof is preferably 30 wt % or more and 80 wt % or less. The respective materials of the paste may be mixed at one time, or may be added and mixed in order while repeating solid-kneading in order to uniformly disperse the respective materials in the paste. As a slurry kneading apparatus, from the viewpoint that uniform kneading can be performed, a planetary mixer or a thin-film spin-type high-speed mixer is preferred.

Examples of the binder include polyvinyldene fluoride and styrene-butadiene rubber. Two or more kinds of these may be included. The content of the binder in the mixture layer is preferably 0.3 wt % or more and 10 wt % or less. By setting the content of the binder to 0.3 wt % or more, the shape of a coating film when the coating film is formed can be easily maintained by the binding effect of the binder. On the other hand, by setting the content of the binder to 10 wt % or less, an increase in resistance in the electrode can be suppressed.

Examples of the conductive auxiliary agent include acetylene black, ketjen black, a carbon fiber, and a carbon nanotube. Two or more kinds of these may be included. The content of the conductive auxiliary agent in the mixture layer is preferably 0.3 wt % or more and 10 wt % or less. By setting the content of the conductive auxiliary agent to 0.3 wt % or more, the conductivity of the positive electrode is improved, and thus the electronic resistance can be reduced. On the other hand, by setting the content of the conductive auxiliary agent to 10 wt % or less, inhibition of movement of lithium ions is suppressed, and thus a decrease in ion conductivity can be suppressed.

In order to increase the energy density of a lithium ion secondary battery, the positive electrode active material is preferably contained in the mixture layer at a ratio as high as possible, and the content of the positive electrode active material in the mixture layer is preferably 80 wt % or more and more preferably 90 wt % or more.

The thickness of the mixture layer is preferably 10 μm or more and 200 μm or less. By setting the thickness of the mixture layer to 10 μm or more, the ratio of a current collector to a battery is suppressed, and thus the energy density can be further improved. On the other hand, by setting the thickness of the mixture layer to 200 μm or less, the charge-discharge reaction is rapidly advanced to the entire mixture layer, and thus high-speed charge-discharge characteristics can be improved.

A lithium ion secondary battery of the present invention preferably includes a negative electrode, a separator, and an electrolytic solution, in addition to the above-described positive electrode. Examples of the shape of the battery include a square type, a winding type, and a laminate type, and the shape thereof can be appropriately selected according to the purpose of use. Examples of a material constituting the negative electrode include graphite, lithium titanate, and silicon oxide. Also regarding the separator and the electrolytic solution, any separator or electrolytic solution can be appropriately selected and used.

The lithium ion secondary battery of the present invention can be obtained, for example, by laminating the positive electrode with a negative electrode with a separator interposed therebetween in a dry environment having a dew point of −50° C. or lower, and adding an electrolytic solution.

EXAMPLES

Hereinafter, the present invention will be described specifically by means of Examples; however, the present invention is not limited only to these Examples. First, the evaluation method in each Example will be described.

[Measurement A] Composition Ratio of LMFP

For the LMFP granulated body, 15 mg of the LMFP granulated body used in each of Examples and Comparative Examples was decomposed by heating using perchloric acid and nitric acid, and the volume was adjusted to 100 mL using ultrapure water. With respect to this solution, Li was measured by atomic absorption spectrometry, and Mn, Fe, and P were measured by ICP emission spectrometry, and the content of each element in a sample was determined and converted into an atomic ratio.

[Measurement B1] Average Particle Diameter of Primary Particles, Number Ratio of Primary Particles Having Particle Diameter of 100 nm or More, and Average Particle Diameter of Granulated Body The average particle diameter of the LMFP primary particles was calculated by magnifying and observing the LMFP granulated body used in each of Examples and Comparative Examples at a magnification of 200,000 using a scanning electron microscope S-5500 (manufactured by Hitachi High-Technologies Corporation), measuring the particle diameters of 200 primary particles randomly selected, and calculating a number average value. However, when the particle was not spherical, the particle diameter of a non-spherical particle was the average value of the major axis and the minor axis that can be measured in a two-dimensional image. When two or more particles were connected by sintering, these particles were regarded as one particle. When it was difficult to determine whether it was sintering or contact, an image was binarized into white and black, and when a line dividing a connection portion was obtained, it was determined as contact so that the particles were regarded as two particles, and when the line was not obtained, it was determined as sintering so that the particles were regarded as one particle.

The number of particles having a particle diameter of 100 nm or more among the measured 200 particles was counted, and the number ratio with respect to 200 particles was calculated.

Similarly, the average particle diameter of the granulated body was calculated by magnifying and observing the LMFP granulated body used in each of Examples and Comparative Examples at a magnification of 3,000 using a scanning electron microscope S-5500 (manufactured by Hitachi High-Technologies Corporation), measuring the particle diameters of 100 granulated bodies randomly selected, and calculating a number average value. However, when the granulated body was not spherical, the particle diameter of a non-spherical particle was the average value of the major axis and the minor axis that can be measured in a two-dimensional image.

[Measurement B2] Average Diameter of Pores of Granulated Body, Sum of Pore Volumes of Pores Having Pore Diameter of 1 nm or More and 60 nm or Less, Maximum Value of Log Differential Pore Volume of Pores Having Pore Diameter of 1 nm or More and 60 nm or Less, and Pore Specific Surface Area of Pores Having Pore Diameter of 1 nm or More and 60 nm or Less In a 5 cc powder cell, 0.3 g of the LMFP granulated body used in each of Examples and Comparative Examples was taken, and measurement values were determined by a mercury injection method using a pore distribution measuring device AutoPore IV9520 Type (manufactured by SHIMADZU CORPORATION) under the condition of an initial air pressure of 7 kPa. The mercury parameter is set to a mercury contact angle of 130.0° and a mercury surface tension of 485.0 Dynes/cm. However, for distinguishing voids between granulated bodies from pores, the average diameter of pores was performed in a range of a pore diameter of 1 nm or more and 200 nm or less. As the average diameter of pores, the median value of the pore diameters was adopted.

[Measurement C] Specific Surface Area

The specific surface area of the LMFP granulated body used in each of Examples and Comparative Examples was measured by a BET flow method (adsorption gas $N_2$) using a fully automatic specific surface area measuring apparatus Macsorb HM Model-1210 (manufactured by Mountech Co., Ltd.).

[Measurement D] Weight Ratio of Carbon Contained in LMFP Granulated Body

The weight ratio of carbon contained in the LMFP granulated body used in each of Examples and Comparative Examples was measured using a carbon/sulfur analyzer EMIA-810W (manufactured by HORIBA, Ltd.).

[Measurement E] Volume Resistivity

The volume resistivity at 25 MPa of 1.0 g of the positive electrode active material used in each of Examples and Comparative Examples was measured using a powder resistance measuring system MCP-PD51 (manufactured by Mitsubishi Chemical Analytech Co., Ltd.).

[Measurement F] Peak Intensity Ratio of X-Ray Diffraction

The peak intensity ratio of X-ray diffraction of the positive electrode active material used in each of Examples and Comparative Examples was measured using D8 ADVANCE manufactured by Bruker ASX K.K. Measurement conditions of 2θ=5° to 70°, a scan interval of 0.02°, and a scan speed of 20 seconds/deg were adopted. Using the analyzing software for powder X-ray diffraction EVA from (manufactured by Bruker ASX K.K.), the background removal (coefficient 1.77) was performed and peak intensities were read to calculate.

[Measurement G] Average Particle Diameter of LMFP Primary Particles in Dispersion for Spray Drying For the LMFP dispersion for spray drying, which was used in each of Examples and Comparative Examples, before adding glucose, the average particle diameter of the LMFP primary particles was measured using a dynamic light scattering particle size distribution measuring apparatus nanoPartica SZ-100V2 (manufactured by HORIBA, Ltd.).

[Measurement H] High-Speed Discharge Characteristics (Energy Density Measurement)

A 2032 coin battery was produced in which the electrode plate, produced in each of Examples and Comparative Examples, cut out to have a diameter of 15.9 mm was used as a positive electrode, a lithium foil cut out to have a diameter of 16.1 mm and a thickness of 0.2 mm was used as a negative electrode, "SETELA" (registered trademark) (manufactured by Toray Industries, Inc.) cut out to have a diameter of 20 mm was used as a separator, and a solution of ethylene carbonate:diethyl carbonate=3:7 (volume ratio) containing 1 M of $LiPF_6$ was used as an electrolytic solution.

The obtained coin battery was charged and discharged three times at a cutoff voltage of 2.5 V and a maximum charge voltage of 4.3 V at a 0.1 C rate, and the energy density (Wh/kg) per positive electrode weight at a 0.1 C rate was measured from the third discharge. Subsequently, the battery was charged at a 0.1 C rate and discharged at a 4.0 C rate, and the energy density (Wh/kg) per positive electrode weight at a 4.0 C rate was measured. For evaluation of high-speed discharge characteristics, a ratio of the energy density during 4.0 C discharge to the energy density during 0.1 C discharge was determined.

[Measurement I] Cycle Resistance

A 2032 coin battery was produced in the same manner as in Measurement H, and was charged and discharged three times at a 0.1 C rate under an environment of 25° C. Subsequently, charging and discharging were performed once at a 1 C rate under an environment of 50° C., and the discharge energy density at this time was regarded as an initial energy density. Subsequently, charging and discharging were performed at a 1 C rate while maintaining an environment of 50° C., and the number of cycles when the discharge energy density was less than 80% of the initial energy density was determined and evaluated as cycle resistance.

In all the charging and discharging tests, charging was performed at a constant current until the maximum voltage reached 4.3 V, and after the maximum voltage was reached, charging was performed at the maximum voltage until the charge current fell below 0.01 C. Discharging was performed at a constant current until the discharge voltage fell below 2.5 V.

Example 1

In 25 g of pure water, 60 mmol of lithium hydroxide monohydrate was dissolved, after which 60 g of diethylene glycol was added thereto to prepare an aqueous lithium hydroxide/diethylene glycol solution. To the obtained aqueous lithium hydroxide/diethylene glycol solution stirred at 2000 rpm with a homo disper (HOMOGENIZING DISPER Model 2.5 manufactured by PRIMIX Corporation), an aqueous solution prepared by dissolving 20 mmol of phosphoric acid (an aqueous 85% solution), 16 mmol of manganese sulfate monohydrate, and 4 mmol of iron sulfate heptahydrate in 10 g of pure water was added to obtain a lithium manganese phosphate nanoparticle precursor. The obtained precursor solution was heated to 100° C. and held at the temperature for 2 hours to obtain LMFP nanoparticles as a solid content. The obtained LMFP was washed by adding pure water without drying and repeating solvent removal by a centrifuge, and the pH of the dispersion was set to 10.1. The solid content concentration of the obtained dispersion was adjusted to 50 wt %, and then subjected to a dispersion treatment under the conditions of 150 MPa and two passes using a wet jet mill Star Burst Mini (manufactured by Sugino Machine Limited).

To the obtained LMFP dispersion, glucose was added at a ratio of 0.15 g with respect to 1.0 g of LMFP and dissolved. Subsequently, the LMFP dispersion was dried and granulated by hot air at 200° C. using a spray dryer (MDL-050B manufactured by Fujisaki Electric Co. Ltd.). The obtained particles were heated at 700° C. for 4 hours in a nitrogen atmosphere using a rotary kiln (desktop rotary kiln manufactured by Takasago Industry Co., Ltd.) to obtain a granulated body of LMFP having a carbon cover layer.

Acetylene black (Li-400 manufactured by Denka Company Limited) and a binder (KF POLYMER L #9305 manufactured by KUREHA CORPORATION) were mixed, then the obtained Li LMFP granulated body was added, and the resulting mixture was solid-kneaded in a mortar. At that time, the mass ratio of each material contained, the granulated body:acetylene black:the binder, was set to 90:5:5. Then, the solid content concentration was adjusted to 48 wt % by adding N-methylpyrrolidinone to obtain a slurry electrode paste. N-methylpyrrolidinone was added to the obtained paste until the paste became flowable, and the paste was treated for 30 seconds under a stirring condition of 40 m/sec using a thin-film spin-type high-speed mixer (manufactured by PRIMIX Corporation "FILMIX" (registered trademark) 40-L type).

The resulting electrode paste was applied to an aluminum foil (thickness: 18 μm) using a doctor blade (300 μm), dried at 80° C. for 30 minutes, and then pressed to produce an electrode plate.

Example 2

An electrode plate was produced in the same manner as in Example 1, except that the amount of diethylene glycol at the time of LMFP synthesis was set to 80 g.

Example 3

An electrode plate was produced in the same manner as in Example 1, except that the amount of diethylene glycol at the time of LMFP synthesis was set to 120 g.

Example 4

An electrode plate was produced in the same manner as in Example 1, except that the amount of glucose to be added was set to 0.07 g with respect to 1.0 g of LMFP.

Example 5

An electrode plate was produced in the same manner as in Example 1, except that the amount of glucose to be added was set to 0.22 g with respect to 1.0 g of LMFP.

Example 6

An electrode plate was produced in the same manner as in Example 1, except that the amount of glucose to be added was set to 0.11 g with respect to 1.0 g of LMFP, and the temperature during firing was set to 600° C.

Example 7

An electrode plate was produced in the same manner as in Example 1, except that the dispersion treatment of LMFP was performed using a shear mixer (Model AX5 Head manufactured by Silverson Nippon K. K.: emulsifying screen) at 5000 rpm for 5 minutes instead of a wet jet mill.

Comparative Example 1

An electrode plate was produced in the same manner as in Example 1, except that the dispersion treatment was not performed using a wet jet mill.

Comparative Example 2

An electrode plate was produced in the same manner as in Example 1, except that the pH of the LMFP dispersion was adjusted not by washing with pure water but by adding LiOH.

Comparative Example 3

To 40 g of pure water, 60 mmol of lithium hydroxide monohydrate, 20 mmol of phosphoric acid (an aqueous 85% solution), 16 mmol of manganese sulfate monohydrate, and 4 mmol of iron sulfate heptahydrate were added, the mixture was placed in a pressure-resistant container, heated to 180° C., and held for 8 hours to obtain LMFP particles as a solid content.

Pure water was added to the obtained LMFP, the LMFP was washed by repeating solvent removal by a centrifuge five times, and the obtained LMFP dispersion was dried with a hot plate to obtain a powder. The average particle diameter of the obtained LMFP primary particles was measured in the same manner as in Measurement Example B, and found to be 281 nm.

The obtained LMFP powder was subjected to a pulverization treatment using a planetary ball mill P5 (manufactured by Fritsch GmbH). The container used for the pulverization treatment was a 45 ml container made of zirconia, 18 zirconia beads having a size of 10 mm were used as beads, and the treatment conditions were a rotation speed of 300 rpm and 6 hours.

Water was added to the obtained LMFP to obtain a dispersion, and glucose was further added thereto at a ratio of 0.15 g with respect to 1.0 g of LMFP and dissolved. Subsequently, the LMFP dispersion was dried and granulated by hot air at 200° C. using a spray dryer (MDL-050B manufactured by Fujisaki Electric Co. Ltd.). The obtained particles were heated at 700° C. for 4 hours in a nitrogen atmosphere using a rotary kiln (desktop rotary kiln manufactured by Takasago Industry Co., Ltd.) to obtain a granulated body of LMFP having a carbon cover layer.

An electrode plate was produced in the same manner as in Example 1 using the obtained LMFP granulated body.

Comparative Example 4

An electrode plate was produced in the same manner as in Comparative Example 3, except that the treatment conditions of the planetary ball mill were set to 200 rpm and 2 hours.

Table 1 and Table 2 show the evaluation results of each of Examples and Comparative Examples.

TABLE 1

| | Composition ratio in $Li_\alpha Mn_a Fe_b PO_4$ | | | Average particle diameter of primary particles | Number ratio of particles having particle diameter of 100 nm or more | Average particle diameter of granulated body | Average diameter of pores | Sum of pore volumes of micropores*[1] | Maximum value of log differential pore volume of micropores*[1] | Pore specific surface area of micropores*[1] |
|---|---|---|---|---|---|---|---|---|---|---|
| | $\alpha$ | a | b | (nm) | (%) | (μm) | (nm) | (cm³/g) | (cm³/g) | (m²/g) |
| Example 1 | 1.00 | 0.79 | 0.21 | 55 | 1.2 | 18.2 | 26 | 0.193 | 0.93 | 31.9 |
| Example 2 | 1.02 | 0.78 | 0.20 | 41 | 3.9 | 17.5 | 28 | 0.198 | 0.95 | 32.1 |
| Example 3 | 1.00 | 0.81 | 0.20 | 26 | 4.8 | 17.4 | 25 | 0.205 | 0.88 | 33.4 |
| Example 4 | 1.00 | 0.79 | 0.21 | 75 | 4.4 | 18.9 | 45 | 0.153 | 0.51 | 28.8 |
| Example 5 | 1.00 | 0.79 | 0.21 | 52 | 1.5 | 15.5 | 38 | 0.158 | 0.67 | 29.1 |
| Example 6 | 1.00 | 0.79 | 0.21 | 70 | 1.5 | 13.9 | 31 | 0.188 | 0.89 | 30.2 |
| Example 7 | 1.01 | 0.79 | 0.21 | 50 | 1.9 | 18.9 | 28 | 0.205 | 0.89 | 32.1 |
| Comparative Example 1 | 1.00 | 0.79 | 0.21 | 69 | 8.9 | 18.1 | 31 | 0.191 | 0.25 | 27.5 |
| Comparative Example 2 | 1.04 | 0.81 | 0.19 | 77 | 9.8 | 15.2 | 47 | 0.162 | 0.21 | 22.9 |
| Comparative Example 3 | 0.98 | 0.82 | 0.20 | 52 | 10.5 | 9.4 | 27 | 0.187 | 0.22 | 29.2 |
| Comparative Example 4 | 0.98 | 0.82 | 0.20 | 153 | 97.1 | 22.8 | 88 | 0.091 | 0.15 | 18.2 |

*[1]Pores having pore diameter of 1 nm or more and 60 nm or less

TABLE 2

| | Positive electrode active material | | | | | Dispersion for spray drying | High-speed discharge characteristics | | | |
|---|---|---|---|---|---|---|---|---|---|---|
| | Specific surface area | Carbon ratio | Volume resistivity | X-ray diffraction peak ratio | | Average particle diameter | Energy density 0.1 C | Energy density 4.0 C | Energy density ratio 4.0 C/0.1 C | Cycle resistance |
| | | | | $I_{20}/I_{29}$ | $I_{35}/I_{29}$ | | | | | |
| | (cc/g) | (wt %) | (Ω · cm) | | | (nm) | (Wh/kg) | (Wh/kg) | | (times) |
| Example 1 | 39 | 2.8 | 1.2 × 10³ | 0.91 | 1.11 | 89 | 598 | 536 | 6.72 | 466 |
| Example 2 | 35 | 2.8 | 1.5 × 10³ | 0.91 | 1.11 | 82 | 592 | 510 | 7.22 | 472 |
| Example 3 | 49 | 2.9 | 8.2 × 10³ | 0.93 | 1.12 | 50 | 580 | 483 | 11.60 | 451 |
| Example 4 | 38 | 1.7 | 4.3 × 10⁴ | 0.92 | 1.11 | 102 | 578 | 477 | 5.67 | 431 |
| Example 5 | 35 | 6.8 | 7.8 × 10² | 0.91 | 1.13 | 61 | 585 | 485 | 9.59 | 442 |
| Example 6 | 36 | 2.1 | 5.2 × 10⁵ | 0.92 | 1.14 | 108 | 583 | 476 | 5.40 | 439 |
| Example 7 | 39 | 2.7 | 2.1 × 10³ | 0.91 | 1.11 | 95 | 595 | 522 | 6.26 | 452 |
| Comparative Example 1 | 32 | 2.6 | 1.1 × 10³ | 0.91 | 1.15 | 240 | 580 | 433 | 2.42 | 389 |
| Comparative Example 2 | 31 | 3.1 | 6.6 × 10⁴ | 0.93 | 1.12 | 198 | 550 | 398 | 2.78 | 367 |
| Comparative Example 3 | 42 | 2.9 | 3.9 × 10³ | 0.81 | 0.99 | 355 | 561 | 421 | 1.58 | 372 |
| Comparative Example 4 | 10 | 2.8 | 3.3 × 10³ | 0.83 | 0.98 | 421 | 422 | 251 | 1.00 | 339 |

The invention claimed is:

1. A positive electrode active material for a lithium ion secondary battery, which comprises a granulated body of positive electrode active material particles for a lithium ion secondary battery, wherein an average particle diameter of primary particles is 10 nm or more and 80 nm or less, and a number ratio of particles having a particle diameter of 100 nm or more is 1.2% or higher and 5.0% or less.

2. The positive electrode active material for a lithium ion secondary battery according to claim 1, wherein the lithium ion secondary battery positive electrode active material particles are olivine-based positive electrode active material particles.

3. The positive electrode active material for a lithium ion secondary battery according to claim 2, wherein the primary particles have a carbon cover layer on surfaces.

4. The positive electrode active material for a lithium ion secondary battery according to claim 3, wherein a ratio of carbon contained in the granulated body is 2.0 wt % or more and 5.0 wt % or less.

5. The positive electrode active material for a lithium ion secondary battery according to claim 2, wherein the lithium ion secondary battery positive electrode active material particles are lithium manganese iron phosphate particles represented by $Li_\alpha Mn_a Fe_b PO_4$ wherein $0.9 \leq \alpha \leq 1.1$, $0.6 \leq a \leq 1.0$, $0 < b \leq 0.4$, and $0.9 \leq a+b \leq 1.1$.

6. The positive electrode active material for a lithium ion secondary battery according to claim 5, wherein a ratio $I_{20}/I_{29}$ of a peak intensity at 20° to a peak intensity at 29° obtained by X-ray diffraction is 0.88 or more and 1.05 or less, and a ratio $I_{35}/I_{29}$ of a peak intensity at 35° to the peak intensity at 29° is 1.05 or more and 1.20 or less.

7. The positive electrode active material for a lithium ion secondary battery according to claim 1, wherein an average diameter of pores is 10 nm or more and 60 nm or less, a sum of pore volumes of pores having a pore diameter of 1 nm or more and 60 nm or less is 0.100 cm$^3$/g or more and 0.300 cm$^3$/g or less, and a maximum value of a log differential pore volume of pores having a pore diameter of 1 nm or more and 60 nm or less is 0.30 cm$^3$/g or more.

8. The positive electrode active material for a lithium ion secondary battery according to claim 1, wherein a pore specific surface area of pores having a pore diameter of 1 nm or more and 60 nm or less is 25 m$^2$/g or more and 50 m$^2$/g or less.

9. The positive electrode active material for a lithium ion secondary battery according to claim 1, wherein a specific surface area is 30 m$^2$/g or more and 45 m$^2$/g or less.

10. The positive electrode active material for a lithium ion secondary battery according to claim 1, wherein a volume resistivity is 10$^5$ Ω·cm or less.

11. The positive electrode active material for a lithium ion secondary battery according to claim 1, wherein an average particle diameter of the granulated body is 1.0 μm or more and 20.0 μm or less.

12. A lithium ion secondary battery obtained by using the positive electrode active material for a lithium ion secondary battery according to claim 1.

* * * * *